The specification in this patent is not in print.
7576X
PATENTED MAY 14, 1833.
J. DINSMORE.
FIRE ALARM.
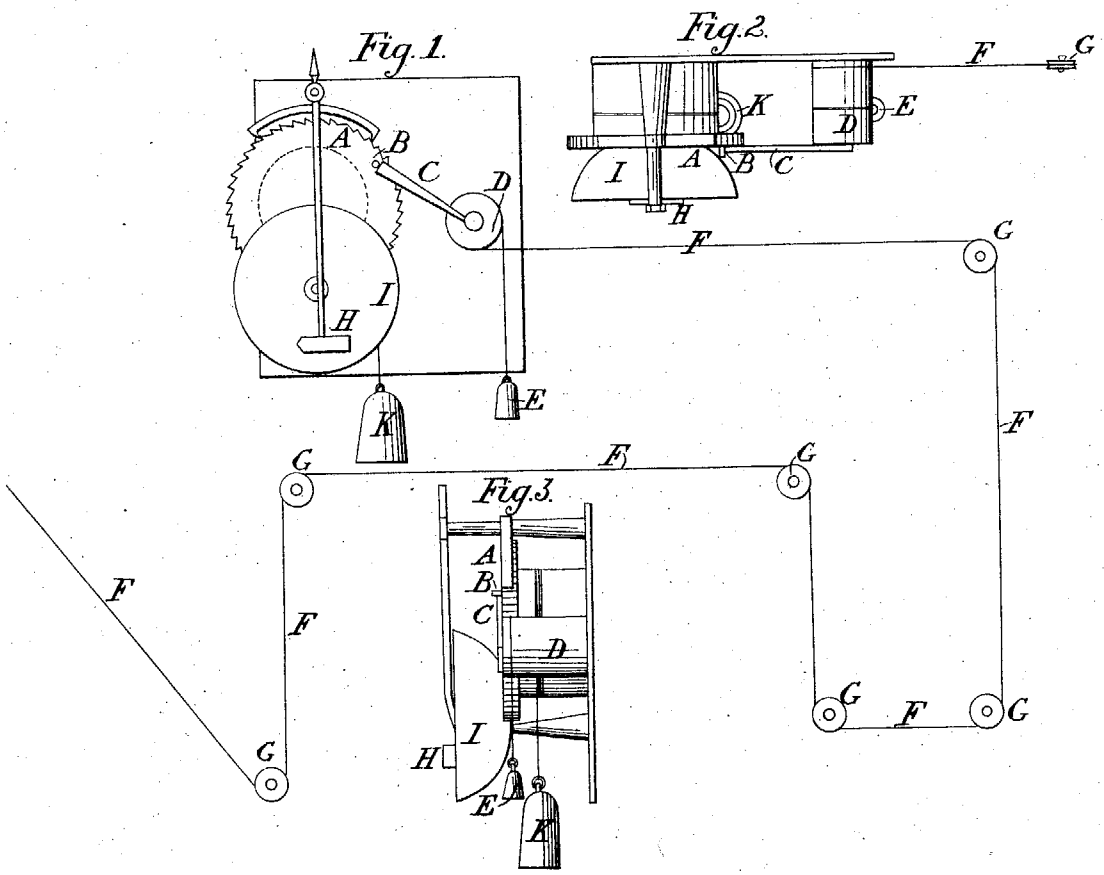

James Dinsmore, County of Somerset, State of Maine

Letters Patent.

The Schedule referred to in these Letters Patent and making part of the same, containing a description in the words of the said James Dinsmore himself of his improvement in the apparatus called the "Fire Alarm".

To all to whom these presents shall come.

Be it known, that I, James Dinsmore of Millburn in the County of Somerset & State of Maine, have invented a new and useful Machine & Apparatus, for the purpose of a "Fire Alarm": to act on the principle of self movement as a sentinel to give notice at the first attack of fire in season to prevent conflagration by that devouring element; and that the following is a full and exact description of the construction and operation of the said Machine as invented by me.

The alarm to be given by a Machine, like the striking part of a common clock, detaching from it all the Machinery except what is necessary for the hammer to strike the bell only, have the bell three times as large (or sufficient for the purpose) this part of the machine I dont claim as my invention, only what I attach to it & the purpose for which it is applied.— I affix to this part a latch, which is the only thing that prevents the alarm from operating, this latch is lifted by a separate Machine attached to the former consisting of a wheel with a small weight sufficient to keep the fire line straight and allow it to stretch & shrink according to its length & state of the atmosphere and also to lift the latch, when the fire line burns off by which it is held & let it run.— The fire line in order to prevent fire from stoves, I fasten at one end, & fix it immediately above the funnel where the fire would most likely first come in contact with wood.— To prevent fire from fire places pass the line round in the corners, place pullies, to let the line under easy, and in ac

X 7576

All other places, where fire would most likely first attack the wood pass the fire line, & make it fast on the small weight wheel on the opposite side, so that when the line burns off in any place the small weight will, after revolving upon the line attached to the catch lift slack sufficient to allow the fire line to stretch & shrink will lift the catch, when the alarm will commence & continue, until the striking weight reaches the floor.—

This Machine may be placed in the sleeping or watch room, and the fire line extended any distance to a store, factory or other building and give the alarm in time to prevent damage by fire.—

James Dinsmore

Witnesses
Eben H. Neil
Nathl [illegible]

Exd.
[illegible]